United States Patent
Li et al.

(10) Patent No.: US 6,858,008 B2
(45) Date of Patent: Feb. 22, 2005

(54) AUTOMATIC ULTRASOUND TRANSMIT POWER SETTING METHOD AND SYSTEM

(75) Inventors: Andrew Li, San Francisco, CA (US); Kutay F. Ustuner, Mountain View, CA (US)

(73) Assignee: Acuson Corporation, Mountain View, CA (US)

(*) Notice: Subject to any disclaimer, the term of this patent is extended or adjusted under 35 U.S.C. 154(b) by 0 days.

(21) Appl. No.: 10/080,367

(22) Filed: Feb. 20, 2002

(65) Prior Publication Data

US 2003/0158479 A1 Aug. 21, 2003

(51) Int. Cl.[7] .............................. A61B 8/00
(52) U.S. Cl. ..................................... 600/437
(58) Field of Search ...................... 600/407, 437, 600/438–471; 73/620–630; 367/7, 11, 130, 138; 128/916; 375/130, 132, 141, 147, 148, 345, 297, 136; 382/275; 455/127, 522, 561, 513, 424

(56) References Cited

U.S. PATENT DOCUMENTS

| | | |
|---|---|---|
| 5,581,517 A | 12/1996 | Gee et al. |
| 5,675,554 A | 10/1997 | Cole et al. |
| 5,685,308 A | 11/1997 | Wright et al. |
| 6,120,446 A | 9/2000 | Ji et al. |
| 6,512,854 B1 * | 1/2003 | Mucci et al. ............ 382/275 |

* cited by examiner

*Primary Examiner*—Ali Imam

(57) ABSTRACT

Methods and systems for automatic adjustment of the transmit power are provided. Excess transmit power is determined as a function of the difference between a noise level and the lower end of the dynamic range of the system as configured. Based on the excess transmit power, the transmit power is reduced from the regulated maximum default settings to about a minimum while substantially preserving the original display image. This minimizes the acoustic energy delivered to the transducer and the body, thus reducing transducer heating and satisfying the FDA's ALARA principle.

26 Claims, 2 Drawing Sheets

AUTOMATIC ULTRASOUND TRANSMIT POWER SETTING METHOD AND SYSTEM

BACKGROUND

The present invention is directed to improvements to medical ultrasonic imaging systems. In particular, control of transmit power is provided.

The Food and Drug Administration (FDA) limits the transmit power used by medical imaging systems. Most ultrasound systems use a transmit power close to this maximum as a default in those cases where the system's own limitations such as maximum peak voltage or maximum total power are not the limiting factors. However, the FDA desires, for every patient and imaging plane being scanned, the transmit power to be reduced to as low as reasonably achievable (ALARA) levels. But, to assure satisfactory signal-to-noise ratios (SNR), the FDA left any reduction in transmit power to the user to control.

The main sources of electronic noise in an ultrasound system are thermal and quantization noise in the receiver. The analog components of the receiver generate the thermal noise, and the analog-to-digital converters generate the quantization noise. Therefore, the electronic noise is generally independent of the transmit power. The received signal level is proportional to the peak transmit voltage for imaging at a fundamental transmit frequency, and the square of the peak transmitter voltage for imaging at a second harmonic of the transmit frequency.

On some ultrasound imaging platforms, the overall system gain compensates for the transmitter power. As the power management process of the ultrasound system readjusts the transmit power level in response to a change in the imaging parameters, or as the user manually reduces the power level, the display brightness is preserved in high SNR areas of the image. On such systems, the noise and not the signal level varies with the power level. But if, even after the power is reduced the noise level remains below a threshold based on the display dynamic range and the system gain, no or few visible changes result in the display image. The noise in the low SNR areas of the image are still mapped to the lowest display gray level, e.g., black. However, such system may not use transmit powers that are as low as reasonably achievable.

BRIEF SUMMARY

The present invention is defined by the following claims, and nothing in this section should be taken as a limitation on those claims. By way of introduction, the preferred embodiments described below include methods and systems for automatic adjustment of the transmit power. Any excess transmit power is a function of the difference between noise level and the lower end of the dynamic range of the system as configured. Based on the excess transmit power, the transmit power is reduced from the regulated maximum default settings to about a minimum while substantially preserving the original display image. This minimizes the acoustic energy delivered to the transducer and the body, thus reducing transducer heating and satisfying the FDA's ALARA principle.

In a first aspect, a method for automatically determining a transmitter power level is provided. A noise level is determined. A minimum displayable signal level given by the current display dynamic range and system gain settings is also determined. A transmit power is set as a function of the noise level and the minimum displayable signal level. The overall system receive gain is readjusted to keep the overall brightness level the same.

In a second aspect, an ultrasound system for automatically determining a transmitter power level is provided. A transmitter is responsive to a transmit power level. A processor is operative to set the transmit power level as a function of a noise level and a minimum displayable signal level given by the current display dynamic range and system gain settings.

In a third aspect, a method for automatically determining a transmitter power reduction factor is provided for a medical ultrasound imaging system. An excess signal-to-noise ratio is determined with a processor. The transmitter power reduction factor is determined as a function of the excess signal-to-noise ratio.

In a fourth aspect, a method for iteratively determining a transmitter power reduction factor is provided. The ALARA transmit power level is determined by reducing the transmit power step by step until the difference between the signal at default power levels and the signal at reduced power levels exceed a certain threshold.

Further aspects and advantages of the invention are discussed below in conjunction with the preferred embodiments.

BRIEF DESCRIPTION OF SEVERAL VIEWS OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Due to recent significant improvements in the sensitivity of transducers and ultrasound systems, the transmit power may often be reduced significantly below regulated levels without any visible change in the display image. Most users are unaware of this fact and unaware of the ALARA principle. To take advantage of these recent improvements without requiring further significant user training, the lowest or almost lowest acceptable power level is determined and applied automatically. To determine a possible reduction in transmit power for ALARA, the SNR level for the current user- or system-selected gains, dynamic range and display depth are determined. If the SNR is above a certain threshold, the transmit power is reduced. The worst case is when there are anechoic regions in the object, i.e., areas where there is no signal. In one embodiment, this worst case scenario is used to determine the power reduction factor. Therefore, the reduction factor is independent of the object being imaged and is only a function of how far down the noise level is from the minimum displayable signal level, i.e., the ratio of the minimum displayable signal level to noise level.

Another benefit of reducing the transmit power is reducing reverb artifacts particularly in cystic areas of the image. This may in turn allow higher pulse repetition frequency resulting in higher frame rates. Operating at ALARA levels also help maximize the battery life on hand-held or other battery-powered imaging systems. By re-distributing some of the transmitter power saved in shallow regions to deeper regions, signal noise ratio at deeper range might be increased. Finally, with less or no need to adjust the transmitter power manually, patient throughput might be increased.

Figure 1:
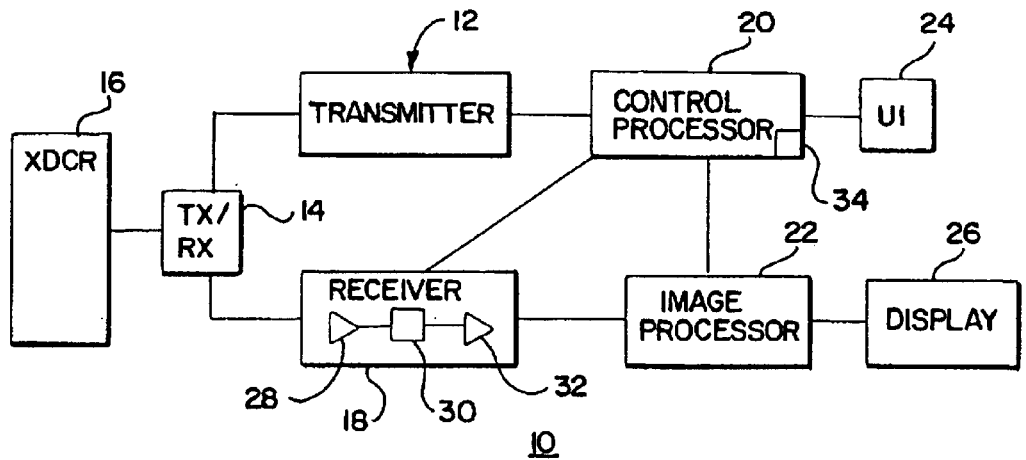
FIG. 1 is a block diagram of a system of one embodiment using automatic transmit power level determination.

FIG. 1 shows a block diagram of a medical ultrasonic imaging system 10 that incorporates one embodiment. The imaging system 10 includes a transmitter 12, a multiplexer 14, a phased array ultrasonic transducer 16, a reciever 18, a control processor 20, an image processor 22, a user interace 24 and a display 26. One ultrasonic imaging system uses a receive beamformer as described in U.S. Pat. No. 5,685,308, a transmit beamformer as described in U.S. Pat. No. 5,675,554, and a controller as described in U.S. Pat. No. 5,581,517. A wide variety of conventional and later developed devices can be used for the elements 12 through 26. All of the elements 12 through 26 of the system 10 can be implemented in any suitable form, using either analog or digital technology. These elements of the system 10 have been provided by way of example in order to provide a framework to allow the preferred embodiments of this invention to be described clearly. It is not intended to limit this invention to any specific form of the elements 12 through 20, and many variations are possible. For example, the transmitter 12 and the receiver 18 may be coupled to separate ultrasonic transducers, eliminating the need for a multiplexer 14. A wide variety of transmitters and receivers can be used.

The control processor 20 comprises one or more of a general processor, a digital signal processor, an applications specific circuit or other processor. The control processor 20 controls various aspects of the system 10 in response to user input on the user interface 24. Alternatively, the control processor 20 comprises a processor for controlling the transmit power. In yet another alternative, the control processor 20 comprises a control processor for one or more of various subsystems, such as a reciever control processor, transmitter control processor, system control processor or combinations thereof. The control processor 20 sets the transmit power level as a function of a noise level and a lowest signal threshold within a dynamic range. For example, the control processor 20 determines an excess signal-to-noise ratio from the noise level and the lowest signal threshold and reduces a default transmit power by a transmit power reduction factor based on the excess signal-to-noise ratio. In the log domain, a difference between the noise level and the lowest signal threshold is calculated, and the transmit power is reduced as a function of the difference. The default transmit power is determined as a function of current imaging parameters.

In one embodiment, the control processor 20 includes a memory 34. The memory 34 is a RAM or other memory for storing a table of noise levels. In response to a measured noise level and/or current imaging parameters, the control processor 20 determines a noise level or other parameter from the memory 34. Other tables or variables for determining an excess SNR, transmit power and/or transmit power reduction factors may be used.

The transmitter 12 is a transmit beamformer or other analog and/or digital device for generating transmit waveforms. As well known to those skilled in the art, the transmitter 12 applies transmit waveforms to the transducer 16 which generates an ultrasonic beam steered along a selected scan line. The transmitter 12 is responsive to a transmit power level. For example, a variable gain amplifier is provided for each transmit channel.

The transducer 16 can be an array or a single-element transducer. When an array transducer is used, the arrangement of the transducer can be selected as appropriate for the particular application. In particular, the array type (1, 1.5, 2 dimensional arrays), the transducer geometry (plane or curved), the scan geometry (linear, Vector™, sector, steered linear, etc.) and the scan method (mechanical, electronic) can all be selected as desired. The transducer 16 forms ultrasonic waves that are transmitted into a region being imaged. Mechanical ultrasonic focusing techniques can be used in combination with or in substitution for conventional phased array focusing techniques.

The receiver 18 is a receive beamformer or other analog and/or digital device for forming samples from signals from the transducer 16. In this example, the receiver 18 uses digital signal processing techniques and forms beamformed receive signals. The receiver 18 includes a plurality of front-end amplifiers 28, one for each of the transducer elements of the transducer 16. In this embodiment, the front-end amplifiers 28 provide a variable front-end gain, as selected by the control processor 20. The receiver 18 acquires a plurality of receive samples with the transmitter off for noise measurements and in response to transmitted signals for generating images.

Each of the front-end amplifiers 28 is connected to a respective analog-to-digital converter 30, which digitizes the respective transducer signal and applies the digitized transducer signal to a respective compensating amplifier 32. The compensating amplifier 32 provides a variable gain (in this case in the digital domain) as specified by the control processor 20. The digitized transducer signals from the compensating amplifiers 32 are then applied to a beamformer to generate beamformed receive signals. Alternately, the compensating amplifier 32 may be positioned after the beamformer.

The system 10 may provide the first stage of transducer signal amplification remote from the transducer or positioned at the transducer. In this latter case, the stage of amplification at the transducer can be considered as included in the receiver.

The beamformed receive signals from the receiver 18 are applied to the image processor 22, which generates display signals for display on the display 26. In this example, image processor 22 comprises a detector (e.g. B-mode or flow processor). A B-mode detector is operable to determine the amplitude of the envelope of the receive signals and log compress the results. Where the receive signals represent noise signals, the control processor 20 accesses the image processor 22 to determine the noise level as a function of the amplitude of the receive samples. The beamformed, detected, log-compressed receive signals are applied to a video filter. A memory allows beamformed receive signals from any desired scan line to be recorded, under control of the control processor 20.

The system 10, including the control processor 20, is configured to provide an adaptive front-end gain as described below. One or more of the front-end amplifiers 28 and/or the compensating amplifiers 32 are responsive to a gain setting based on the transmit power level such that image brightness is substantially preserved independent of user settings. In general terms, the signal strength of the returned echoes is measured (preferably though but not necessarily before beam formation) as a function of one or more of the following parameters: depth, scan line angle, beam, and transducer channel. The measurement of return echo strength is repeated, for example once every M image frames or once every T seconds, where M and T can be user-selectable parameters. As another approach, the measurement of return echo strength can be made only upon user request, such as when the user presses a selected key. Once the return echo strength has been measured, an appropriate, adaptively determined front-end gain is determined and used to control the front-end amplifiers 28 and the compensating amplifiers 32. In alternative embodiments, no or different adaptive front-end gain for the receiver 18 is provided.

Figure 2:
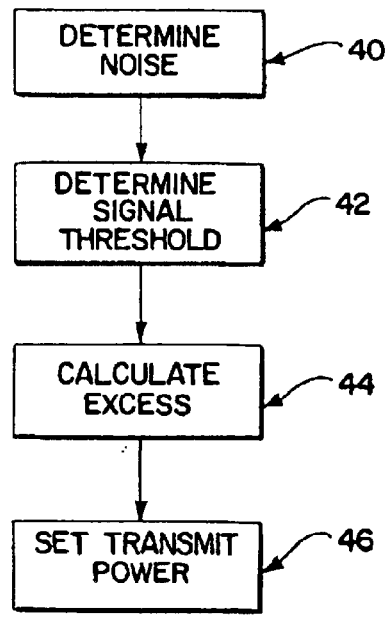
FIG. 2 is a flow chart diagram of one embodiment for determining a transmit power level.

FIG. 2 shows one embodiment for automatically determining the power level of the transmitter of the system 10 of FIG. 1 or another system. In general, a noise level, such as an average noise level, is determined in act 40. In act 42, a signal threshold value is determined, such as a bottom value for a dynamic range. An excess power is determined from a noise level and a signal threshold in act 44. In act 46, the transmit power is set as a function of the excess power, such as reducing a default transmit power based on current imaging parameters by the excess power. In alternative embodiments, other acts determine the transmit power, such as calculating the excess power in response to factors other than noise and/or the threshold signal value.

Automatic determination of the power level begins in response to user input or in response to a setting or change of an imaging parameter. For example, the user initializes the automatic determination by depressing a button after selecting one or more imaging parameters. As another example, once a user changes an imaging parameter or just prior to imaging, the system automatically determines the power level without further user input.

In act 40, the noise level is determined. A noise image is generated and may be stored in a noise image memory or a noise level calculated and stored. The noise image is generated with the transmitters turned off. That is, during acquisition of the noise image, the imaged tissue is not insonified, and the resulting noise image provides a measure of electronic noise in the system as a function of image coordinates such as range and azimuth or range, azimuth and elevation free of energy from a transmission by the transmitter 12. The noise images can be defined on a different, and usually coarser, grid than input signal images for imaging, and the noise images may vary in one or more of the range, azimuth and elevation axes. The noise image is generated for a signal point, a plurality of range samples on a signal line, a sub-set of the imaging lines or samples, or for all the samples of the entire imaging region.

The images of the statistical parameters indicative of the electronic noise (background noise information) are referred to simply as the noise images. In the following examples, the statistical parameter that is used as a measure of noise is the local standard deviation of the pre-compression noise images σ(In) or the local mean of the post-compression noise images <In>. The compression here is assumed to be logarithmic compression.

The noise images may (1) be acquired by imaging without insonification, i.e. with the transmitters turned off (see the discussion in U.S. Pat. Nos. 6,120,446 or 6,423,003), or (2) be estimated by using the known differences in bandwidth and/or spatial or temporal correlation lengths of the signal and noise (see the discussions in U.S. Pat. Nos. 6,775,400 and 6,704,437 (application Ser. Nos. 09/430,591 and 09/431,304) or (3) be computed using a system noise model based on a set of currently prevailing imaging parameters (see the discussion in U.S. Pat. No. 6,120,446). All of these patents are hereby incorporated by reference in their entirety. The methods described above for acquiring noise images may be combined in various ways, and other methods can be used.

The noise images can, in general, be pre-detection or post-detection images, pre-compression (i.e., amplitude or intensity) or post-compression (i.e., log) images, or pre- or post-scan conversion images. In one embodiment, the noise images are post-detection, such as representing the amplitude of the envelope of the input information. Other signal characteristics may be detected, such as B-mode, color Doppler energy, color Doppler velocity, or color Doppler variance, whether in fundamental or harmonic imaging mode, including both contrast harmonic and tissue harmonic imaging detected signals. When the noise images are measured, the system is configured for reception pursuant to default imaging parameters, such as imaging parameters selected to provide a maximum dynamic range or a low signal threshold level. Alternatively, the noise images are acquired using current, user selected imaging parameters and the noise image data is acquired before thresholding or clipping to the corresponding dynamic range.

The noise level is determined from the noise image data. For example, an maximum noise for all spatial locations of one or more noise images is calculated. As another example, an maximum noise value is determined for each of a plurality of spatial regions, such as averaging noise values associated with a plurality of 6×6 or 8×8 pixel or sample regions (i.e. 36 samples). As yet another example, the noise level associated with current imaging parameters, such as the receive gain, is predicted using a model or a look-up table from the measured noise associated with the default imaging parameters. As yet another example, the noise level is predicted from the current imaging parameters without noise image data based on experimentation or an algorithm based on the known system component characteristics. A model or look-up table outputs a noise level in response to the current imaging parameters. In alternative embodiments, an average noise value, mean value in the log domain, standard deviation of noise in the radio frequency domain or another function is used for determining the noise level.

In act 42, the minimum displayable signal level or signal threshold is determined. This level is the lowest value of the dynamic range for the current imaging parameters. Any signal or noise below the minimum displayable signal level (or the lowest value of the dynamic range) are mapped to black if a gray scale is used or the lowest value of the display map if a map other than the gray scale is used. The signal threshold is determined as a function of various imaging parameters, such as display depth, receive gain, and display dynamic range.

In act 44, the excess power for determining the transmit power reduction without mapping noise to a gray level is determined. In one embodiment, an excess signal-to-noise ratio is calculated. A difference in the log domain between the noise level and the signal threshold or minimum displayable signal level represensts the excess signal-to-noise ratio or excess power. The transmitter power adjustment factor is equal to the difference or excess signal-to-noise ratio, is less than the excess power or excess SNR by a threshold amount, is a percentage as a function of the excess and the default transmit power or is based on another function. A transmitter power adjustment factor for each location on the grid, region of the image or entire image is determined. At each location where the predicted back-end noise level is less than the minimum displayable signal level, the transmitter power adjustment factor is set such that when applied to the transmitter voltage, the predicted noise level is mapped to black. On the other hand, for those locations where the predicted back-end noise level is larger than or equal to the minimum displayable signal level, the transmitter power adjustment factor is set to be 1.0. Alternatively, the transmit power is set as a function of the excess power or excess signal-to-noise ratio.

Images are images of signal plus the additive electronic noise. Therefore, the excess signal-to-noise ratio is the (signal plus noise) to noise ratio, rather than to the signal to noise ratio (SNR). We will, however, use the term SNR broadly to include the (signal plus noise) to noise ratio.

The excess SNR is calculated as above or using other methods. For pre-compression images I and In, the SNR for a point (x,y,z,t), i.e., the point SNR is defined as $$SNR_p = |I(x,y,z,t)|/\sigma(I_n(x,y,z,t)) \qquad (2)$$

The noise standard deviation is estimated using the noise samples both at and around the point (x,y,z,t). For post-compression images I and In, the point SNR is defined as $$SNR_p = I(x,y,z,t) - <I_n(x,y,z,t)> \qquad (3)$$

The noise mean is, similarly, estimated using the noise samples at and around the point (x,y,z,t). The local mean along any spatial or time axis can very simply be estimated by low-pass filtering the noise image(s) along that axis. Also subtraction is an easier and cheaper process than division. Therefore, in the following examples, we will use the post-compression definition of the SNR.

In addition to the point SNR, also useful is the local SNR. For post-detection images I and $I_n$, the local SNR is given by $$SNR_L = <I(x,y,z,t)> - <I_n(x,y,z,t)> \qquad (4)$$

i.e., the local SNR is the mean signal to mean noise ratio. The local means of the input and noise are estimated by using the input and noise samples both at and around the (x,y,z,t) point. Therefore, the local SNR is a measure of the local average SNR.

The transmit power level is set in act 46. The transmit power level is set as the default transmit power level based on the current imaging parameters multiplied by the transmitter power reduction factor. Alternatively, the transmitter power reduction factor in dB is subtracted from the default transmit power level, For example, the transmit power level for each element of the transducer 16 is reduced by the decibel level of the transmitter power reduction factor, or the voltage level of the transmitter 12 is multiplied by a transmit power reduction ratio corresponding to the decibel level.

The default transmit power is the maxium transmit power that can be applied for the current imaging parameters without exceeding the maximum FDA regulated levels, such as Ispta and MI, and the maximum system hardware limitations, such as per channel average power, total average power and thermal index. Some of the imaging parameters that affect the default transmit power level are the transmit pulse spectral shape, center frequency and bandwidth, transmit apodization type and aperture size, focal depth and display depth.

The transmit power level is set for each region, such as the regions used to determine noise levels, or for an entire image. By setting the transmit power differently for sub-sets of the image, such as groups of lines, the mechanical index is more efficiently reduced. In one embodiment, the transmit power is determined for each of the edge lines and a center line. For scan lines in between these lines, the transmit power level is interpolated, such as linear interpolation. The transmit power level may be filtered or altered to avoid large changes, such as 1 dB, between regions or scan lines.

Once set, images are acquired in response to transmission at the transmit power levels for each element in the transmit aperture. The images are responsive to the current imaging parameters. If the current imaging parameters are changed, the transmit power level is automatically recalculated or kept the same based on the parameter changed or the amount of change.

Figure 3:
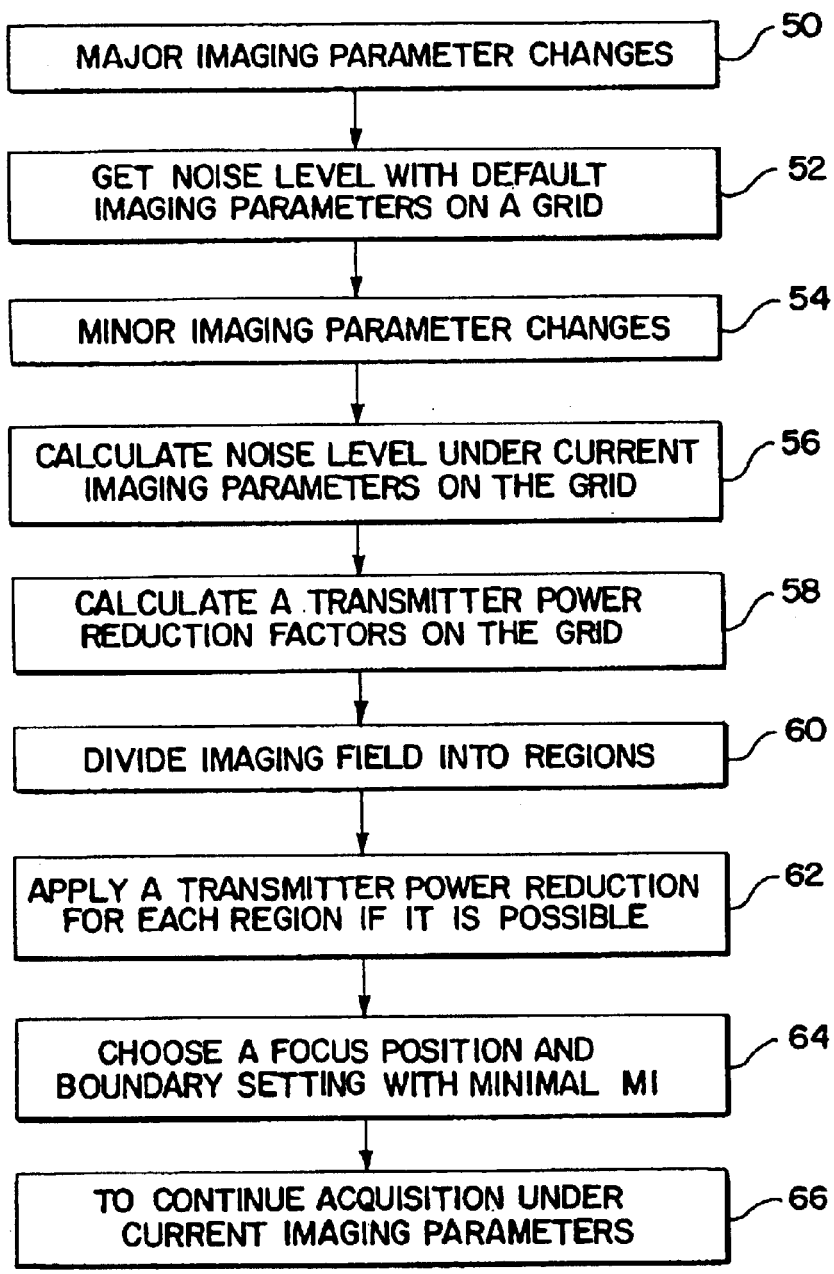
FIG. 3 is a flow chart diagram of a further embodiment of the flow of FIG. 2.

FIG. 3 shows one embodiment for determining the transmitter power reduction factor based on a measure of the excess signal to noise ratio. The method applies a negative offset (i.e. the transmitter power reduction factor) to the transmitter gain while preserving signal quality. The gain values and stored signals are represented in units of dB.

The method of FIG. 3 is used for a medical system that defaults to the full transmitter power allowed by power management or government regulations for any given imaging parameters. The system also has a compensated transmitter power, so that in reducing the transmit power, the back-end signal level is maintained at the same level. For given imaging parameters, the amount the back-end noise level increases if the transmitter power is reduced is known based on modeling or experimentation. Alternatively, an iterative process with set increases in gain for each determination of excess SNR is used. One system for the method of FIG. 3 is the Sequoia® ultrasound system manufactured by Acuson-A Siemens Company, but other ultrasound systems by the same or different manufactures with the same or different attributes discussed above may be used.

In act 50, the current imaging parameters are changed, such as changing in response to user input or other trigger. In act 52, the noise level is determined using default imaging parameters as discussed above for FIG. 2. The transmitter is turned off or the transmit power level is set to zero for each element of the transducer 16 (FIG. 1). The measurement of back-end noise level under default imaging parameters is obtained by turning off the transmitter power without altering transmitter power compensation in the receiver. In this embodiment, due to spatial smoothness, back-end noise level is measured on a decimated grid as compared to signal imaging. A plurality of receive signals are captured, detected and log-compressed. In alternative embodiments, act 52 is not used and the back-end noise level is derived from given imaging parameters.

The back-end noise level measured under default imaging parameters is represented as:

$$n_0^2 = (m_e^2 + m_q^2 L(f_0)^{-2}) g_0^2; \qquad (5)$$

where $m_e$ represents the mean value of electronic noise at the back-end or receiver of the system with full transmitter power and unity back-end gain, $m_q$ represents the mean value of quantization noise at the back-end or receiver of the system with full transmitter power, unity front-end gain and unity back-end gain, L( ) is a clip function with the lower limit $L_m = 0$ dB and the higher limit $L_M = 63.75$ dB associated with the hardware limitation of analog amplifiers of this embodiment, $f_0$ and $g_0$ are the default front-end gain and default back-end gain, respectively, and $n_0$ is the back-end noise level with full transmitter power, and default front-end and back-end gains. In this embodiment, the measurement on a grid spaced by 16 by 8 imaging samples in axial and lateral direction, respectively. Other representations and processes may be used for determining the noise level.

Once measured, the noise image is used until a major change in imaging parameters is made. Accordingly, minor changes in act 54 are made without repetition of act 52. Minor changes comprise changes the result in predicable or minimal differences in the noise level. For example, a large change in the operating frequency is a major change, but changes to transmitter focus position and back-end display parameters, such as master gain, depth gain compensation (DGC) and dynamic range (DNR) are minor changes.

In act 56, the back-end noise level under current imaging parameters based on the previous noise level measurement is predicted. Defining the mean value of back-end or receiver noise level as n and the transmitter power adjustment factor as $\alpha$, the noise is represented as:

$$n(\alpha)^2 = (m_e^2 + m_q^2 L(\alpha^{-1}f)^{-2})(\alpha^{-k}g)^2; \text{ for } 0<\alpha<=1; \quad (6)$$

where f and g represent the front-end gain of the analog amplifiers and the combination of various digital gains applied after A/D converters, respectively, $\alpha^{-1}$ and $\alpha^{-k}$ represent the front-end and back-end gain transmitter power adjustment compensation terms, respectively. k is a harmonic imaging factor. For fundamental imaging, k=1 and for harmonic imaging, k=2. Combing equations (5) and (6), equation 7 results as follows:

$$n(\alpha)^2 = (m_e^2 + m_q^2 L(\alpha^{-1}f_0\Delta f)^{-2})(m_e^2 + m_q^2 L)(f_0)^{-2})^{-1}(\alpha^{-k}\Delta g)^2 n_0^2;$$
$$\text{for } 0<\alpha<=1; \quad (7)$$

where $\Delta f = f/f_0$ is the adaptive front-end gain compensation delta gain, and $\Delta g = g/g_0$ is the combination of back-end tissue equalization gain compensation delta gain (e.g. 30 dB master gain offset to avoid truncation) and the difference of user selected back-end gain from the default back-end gain, based on master gain, depth gain compensation gain and DNR adjustment. Both $\Delta f$ and $\Delta g$ can be derived from given imaging parameters. Letting:

$$\underline{m}_e^2 = m_e^2 / (m_e^2 + m_q^2 L(f_0)^{-2}) \quad (8)$$
$$= 1.0 / (1.0 + (m_q/m_e)_*^2 L(f_0)^{-2}),$$

and $$\underline{m}_q^2 = m_q^2 / (m_e^2 + m_q^2 L(f_0)^{-2}) \quad (9)$$
$$= (m_q/m_e)^2 / (1.0 + (m_q/m_e)_*^2 L(f_0)^{-2}).$$

$\underline{m}_e$ and $\underline{m}_q$ depend on the ratio of $m_q/m_e$. Equation (7) simplifies to:

$$n(\alpha)^2 = (\underline{m}_e^2 + \underline{m}_q^2 L(\alpha^{-1}f_0\Delta f)^{-2})(\alpha^{-k}\Delta g)^2 n_0^2; \text{ for } 0<\alpha<=1. \quad (10)$$

The noise level for the current imaging parameters is predicted from the measured noise level using equation 10.

In act 58 the transmitter power adjustment factor is calculated separately for each location on the grid. At each location where predicted back-end noise level is less than the signal threshold, the transmitter power adjustment factor is set below one for multiplication with the default transmit power or set to a dB value corresponding to the excess SNR. For those locations where the predicted back-end noise level is larger than or equal to the signal threshold, the transmitter power adjustment factor is set to be 1.0 for multiplication or zero for a dB based adjustment.

For the embodiment of FIG. 3, the transmitter power adjustment factor of act 58 is represented mathematically. $v_m$ is the back-end or receiver minimum signal value threshold or lowest value of the dynamic range. At each location on the grid, the transmitter power adjustment factor $\alpha_m$ is:

$$\alpha_m = 1, \quad \text{if } n(1) >= v_m;$$
$$= \gamma_m, \quad \text{otherwise and if } (\alpha^{-1}f_0\Delta f) <= L_M;$$
$$= \gamma'_m, \quad \text{otherwise};$$

where $\gamma_m$ is the solution of $$v_m^2 = (\underline{m}_e^2 + \underline{m}_q^2(\alpha^{-1}f_0\Delta f)^{-2})(\alpha^{-k}\Delta g)^2 n_0^2;$$

while $\gamma'_m$ is the solution of $$v_m^2 = (\underline{m}_e^2 + \underline{m}_q^2 L_M^{-2})(\alpha^{-k}\Delta g)^2 n_0^2.$$

For fundamental imaging, k=1, then:

$$\gamma_m^2 = (\underline{m}_e^2(\Delta g)^2 n_0^2)/(v_m^2 - \underline{m}_q^2(f_0\Delta f)^{-2}(\Delta g)^2 n_0^2); \text{ and}$$

$$\gamma'_m^2 = (\underline{m}_e^2 + \underline{m}_q^2 L_M^{-2})(\Delta g)^2 n_0^2 / v_m^2;$$

For harmonic imaging, k=2, then:

$$\gamma_m^2 = (\underline{m}_q^2(f_0\Delta f)^{-2}(\Delta g)^2 n_0^2 + ((\underline{m}_q^2(f_0\Delta f)^{-2}(\Delta g)^2 n_0^2)^2 + (4v_m^2\underline{m}_e^2(\Delta g)^2 n_0^2))^{1/2})/(2v_m^2), \text{ and}$$

$$\gamma'_m^2 = (\underline{m}_e^2 + \underline{m}_q^2 L_M^{-2})(\Delta g)^2 n_0^2 / v_m^2.$$

In act 60, the imaging field is divided into one or more regions. The transmitter power is adjusted for each region independently. For example, the regions are created as a function of different sequential focus zones. Therefore, the imaging field is divided by the number of sequential foci according to the focus boundaries. Other divisions, such as a function of scan line or multiple collinear transmit beams may be used.

In act 62, the maximum power adjustment factor within each region is applied to the transmit power. If the maximum is smaller than 1.0, the transmit power adjustment factor is applied to the transmitter voltage. Different transmitter power or voltage levels along an acquisition line in axial direction can be implemented. In the case of sequential focus, different transmitter power can be applied to each focus zone. In the case of multiple collinear transmit beams, an adjustable weight factor can be applied to each focus segment. In both of these cases, the transmitter power is adjusted.

In optional act 64, different possible focus positions and focus boundaries are checked for the minimal mechanical index. The focus boundaries may be determined as a function of the focal positions. For each of multiple focus position and focus boundary, acts 56–62 are repeated. A power adjustment factor for each repetition is acquired. The focus position and focus boundary corresponding to the minimal mechanical index (MI) is selected. If there is more than one case with minimal MI, the focus position and focus boundary with maximum power reduction in the central imaging region is selected.

In one embodiment, the transmitter power reduction factor or the transmit power level is displayed to the user. The display may be useful to the user for imaging contrast agents. Contrast agents are micro-spheres or other ultrasound responsive agents injected into a patient. Contrast agents are typically destroyed by higher transmit energies. If destroyed, imaging may be ceased until the blood flow has delivered additional contrast agents to the imaged region. Reducing the transmit energy makes real-time imaging of contrast agents without destruction more likely. Alternatively, the transmit power reduction factor is used for imaging tissue or fluids without contrast agents.

While the invention has been described above by reference to various embodiments, it should be understood that many changes and modifications can be made without departing from the scope of the invention. For example, any method for determining the excess power and adjusting or setting the transmit power accordingly may be used. Digital or analog components may be used. Data at any stage of processing may be used.

It is therefore intended that the foregoing detailed description be understood as an illustration of the presently preferred embodiment of the invention, and not as a definition of the invention. It is only the following claims, including all equivalents, that are intended to define the scope of this invention.

What is claimed is:

1. A method for automatically determining a transmitter power level, the method comprising:
   (a) determining a noise level;
   (b) determining a lowest value of a display dynamic range; and
   (c) setting a transmit power as a function of the noise level and the lowest value.

2. The method of claim 1 wherein (a) and (b) comprise determining an excess signal-to-noise ratio and (c) comprises reducing a default transmit power by a transmit power reduction factor, the transmit power reduction factor a function of the excess signal-to-noise ratio.

3. The method of claim 2 wherein (c) comprises reducing by the transmit power reduction factor being equal to the excess signal-to-noise ratio.

4. The method of claim 1 further comprising:
   (d) setting a gain as a function of transmit power; and
   (e) preserving brightness based on (d) independent of user settings.

5. The method of claim 1 wherein (c) comprises, in the log domain:
   (c1) calculating a difference between the noise level and the lowest value; and
   (c2) reducing the transmit power as a function of the difference.

6. The method of claim 1 wherein (a) comprises:
   (a1) acquiring a plurality of receive samples with transmitters off; and
   (a2) determining the noise level as a function of amplitudes of the receive samples.

7. The method of claim 6 wherein (a1) comprises acquiring the plurality of receive samples responsive to default imaging parameters; and wherein (a) further comprises:
   (a3) measuring an actual noise level as a function of the amplitude of the receive samples, wherein (a2) comprises predicting the noise level for current imaging parameters as a function of the actual noise level.

8. The method of claim 1 wherein (a) comprises determining the noise level from a table in response to current imaging parameters.

9. The method of claim 1 wherein (a), (b) and (c) are performed independently for each of a plurality of regions of an imaging field.

10. An ultrasound system for automatically determining a transmitter power level, the system comprising:
    a transmitter responsive to a transmit power level; and
    a processor is operative to set the transmit power level as a function of a noise level and a lowest value of a display dynamic range.

11. The system of claim 10 wherein the processor is operative to determine an excess signal-to-noise ratio from the noise level and the lowest value and reduce a default transmit power by a transmit power reduction factor, the transmit power reduction factor a function of the excess signal-to-noise ratio, the default transmit power determined as a function of current imaging parameters.

12. The system of claim 10 further comprising:
    a receive amplifier responsive to a gain, the gain being responsive to the transmit power level such that image brightness is substantially preserved independent of user settings.

13. The system of claim 10 wherein the processor is operative to, in the log domain, calculate a difference between the noise level and the lowest value, and reduce the transmit power as a function of the difference.

14. The system of claim 10 further comprising:
    a receiver operable to acquire a plurality of receive samples with the transmitter off;
    a detector operable to determine an amplitude of the receive samples; and
    wherein the processor is operable to determine the noise level as a function of the amplitude of the receive samples.

15. The system of claim 10 further comprising:
    a memory having a table of noise levels;
    wherein the processor is operable to determine the noise level from the table in response to current imaging parameters.

16. A method for automatically determining a transmitter power reduction factor in a medical ultrasound imaging system, the method comprising:
    (a) determining an excess signal-to-noise ratio with a processor; and
    (b) determining the transmitter power reduction factor as a function of the excess signal-to-noise ratio.

17. The method of claim 16 further comprising:
    (c) displaying the transmitter power reduction factor.

18. The method of claim 16 further comprising:
    (c) setting a transmitter power level as a function of the transmitter power reduction factor.

19. The method of claim 16 further comprising:
    (c) initiating (a) and (b) in response to user input.

20. The method of claim 16 further comprising:
    (c) recalculating a transmit power level in response to a change in an imaging parameter; and
    (d) initiating (a) and (b) automatically in response to (c).

21. The method of claim 16 wherein (a) comprises:
    (a1) determining a noise level; and
    (a2) calculating the excess signal-to-noise ratio as a function of a difference, in the log domain, between a minimum display signal level and the noise level.

22. The method of claim 21 wherein (a1) comprises:
    turning a transmit power off;
    acquiring a plurality of receive samples that vary in range, the receive samples free of energy from a transmit; and
    determining the noise level as a function of an envelope amplitude of the receive samples.

23. A method for automatically determining a transmitter power reduction factor in a medical ultrasound imaging system, the method comprising:
    (a) determining an excess power with a processor; and
    (b) determining the transmitter power reduction factor as a function of the excess power.

24. A method for automatically determining a transmitter power reduction factor in a medical ultrasound imaging system, the method comprising:
    (a) iteratively reducing a transmit power;
    (b) determining a difference between a first signal at a default power level and a second signal at a power level responsive to (a); and
    (c) selecting the transmit power wherein the difference exceeds a threshold.

25. A method for automatically determining a transmitter power level, the method comprising:
(a) determining a noise level;
(b) determining a lowest signal amplitude level that is displayable for a given display dynamic range and gain settings; and
(c) setting a transmit power as a function of the noise level and the lowest signal amplitude value.

26. A method for automatically determining a transmitter power level, said method comprising:

determining an excess signal-to-noise ratio from a noise level and a lowest value of a display dynamic range; and reducing a default transmit power by a transmit power reduction factor, said default power set as a function of said noise level and said lowest value of said display dynamic range, said transmit power reduction factor a function of he excess signal-to-noise ratio.

* * * * *